US008738053B2

(12) United States Patent
Zhang et al.

(10) Patent No.: US 8,738,053 B2
(45) Date of Patent: May 27, 2014

(54) METHOD AND SYSTEM FOR FINDING A THRESHOLD FOR SEMI-ORTHOGONAL USER GROUP SELECTION IN MULTIUSER MIMO DOWNLINK TRANSMISSION

(75) Inventors: Chengjin Zhang, La Jolla, CA (US); Jun Zheng, La Jolla, CA (US); Vinko Erceg, Cardiff, CA (US); Severine Catreux-Erceg, Cardiff, CA (US); Pieter Roux, San Diego, CA (US); Pieter van Rooven, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 3065 days.

(21) Appl. No.: 11/231,557

(22) Filed: Sep. 21, 2005

(65) Prior Publication Data

US 2007/0066229 A1 Mar. 22, 2007

(51) Int. Cl.
*H04B 1/00* (2006.01)
*H04B 15/00* (2006.01)
*H04B 7/00* (2006.01)
*H04B 3/46* (2006.01)
*H04B 17/00* (2006.01)
*H04Q 1/20* (2006.01)
*H04W 4/00* (2009.01)

(52) U.S. Cl.
USPC ............ 455/501; 455/63.1; 455/69; 370/334; 375/227

(58) Field of Classification Search
USPC .......... 455/500, 501, 522, 63.1, 67.11, 67.13, 455/69; 370/241, 318, 334; 375/224, 227
See application file for complete search history.

(56) References Cited

U.S. PATENT DOCUMENTS

| 6,650,881 | B1 * | 11/2003 | Dogan | 455/276.1 |
|---|---|---|---|---|
| 7,120,395 | B2 * | 10/2006 | Tong et al. | 455/101 |
| 7,496,365 | B2 * | 2/2009 | Pipon et al. | 455/446 |
| 7,548,752 | B2 * | 6/2009 | Sampath et al. | 455/447 |
| 2003/0109226 | A1 * | 6/2003 | Brunner et al. | 455/69 |
| 2005/0037718 | A1 * | 2/2005 | Kim et al. | 455/101 |
| 2005/0147025 | A1 * | 7/2005 | Auer | 370/203 |
| 2005/0265223 | A1 * | 12/2005 | Song | 370/208 |
| 2006/0068718 | A1 * | 3/2006 | Li et al. | 455/69 |
| 2006/0140255 | A1 * | 6/2006 | Jonsson | 375/148 |
| 2006/0205357 | A1 * | 9/2006 | Kim | 455/69 |
| 2007/0025236 | A1 * | 2/2007 | Ma et al. | 370/208 |
| 2007/0153760 | A1 * | 7/2007 | Shapira | 370/350 |
| 2010/0150036 | A1 * | 6/2010 | Zheng et al. | 370/281 |

OTHER PUBLICATIONS

T. Yoo and A. J. Goldsmith, "Optimality of zero-forcing beamforming with multiuser diversity," in 2005 IEEE International Conference on Communications, Seoul, Korea, May 2005, pp. 542-546.

(Continued)

*Primary Examiner* — Andrew Wendell
(74) *Attorney, Agent, or Firm* — Sterne, Kessler, Goldstein & Fox PLLC (57) ABSTRACT

Various aspects of a method and a system for finding a threshold for semi-orthogonal user group selection in multiuser MIMO downlink transmission are presented. Aspects of a system for semi-orthogonal user group selection may include a processor that computes an orthogonality measurement between one of a plurality of signals and at least one of a remaining portion of the plurality of signals. The processor may compare each of the orthogonality measurements to a threshold orthogonality value based on a computed probability. The processor may select a user group, based on the threshold orthogonality value, including one of the plurality of signals and one or more signals selected from the remaining portion of the plurality of signals.

21 Claims, 7 Drawing Sheets

(56) References Cited

OTHER PUBLICATIONS

E. Telatar, "Capacity of multi-antenna gaussian channels," Bell Labs Technical Journal, Jun. 1995.

G. J. Foschini, "Layered space-time architecture for wireless communication in a fading environment when using multiple antennas," Bell Labs Technical Journal, vol. 1, No. 2, pp. 41-59, 1996.

S. Caire, G. Shamai, "On the achievable throughput of a multiantenna gaussian broadcast channel," IEEE Trans. on Information Theory, vol. 49, No. 7, pp. 1691-1706, 2003.

C. B. Peel, B. M. Hochwald, and A. L. Swindlehurst, "A vector-perturbation technique for near-capacity multiantenna multiuser communication—Part I: channel inversion and regularization," IEEE Trans. on Communications, vol. 53, No. 1, pp. 195-202, Jan. 2005.

C. Windpassinger, R. F. H. Fischer, T. Vencel, and J. B. Huber, "Precoding in multiantenna and multiuser communications," IEEE Trans. on Wireless Communications, vol. 3, No. 4, pp. 1305-1316, 2004.

B. M. Hochwald, C. B. Peel, and A. L. Swindlehurst, "A vector-perturbation technique for near-capacity multiantenna multiuser communication—Part II: perturbation," IEEE Trans. on Communications, vol. 53, No. 3, pp. 537-544, Mar. 2005.

* cited by examiner

METHOD AND SYSTEM FOR FINDING A THRESHOLD FOR SEMI-ORTHOGONAL USER GROUP SELECTION IN MULTIUSER MIMO DOWNLINK TRANSMISSION

CROSS-REFERENCE TO RELATED APPLICATIONS/INCORPORATION BY REFERENCE

This application makes reference to:
U.S. application Ser. No. 11/232,340 filed Sep. 21, 2005;
U.S. application Ser. No. 11/232,266 filed Sep. 21, 2005;
U.S. application Ser. No. 11/231,501 filed Sep. 21, 2005;
U.S. application Ser. No. 11/231,699 filed Sep. 21, 2005; and
U.S. application Ser. No. 11/231,586 filed Sep. 21, 2005;
U.S. application Ser. No. 11/232,369 filed Sep. 21, 2005;
U.S. application Ser. No. 11/231,701 filed Sep. 21, 2005;
U.S. application Ser. No. 11/232,362 filed Sep. 21, 2005; and
U.S. application Ser. No. 11/231,416 filed Sep. 21, 2005.

Each of the above stated applications is hereby incorporated by reference in its entirety.

FIELD OF THE INVENTION

Certain embodiments of the invention relate to processing of signals in communications systems. More specifically, certain embodiments of the invention relate to a method and system for finding a threshold for semi-orthogonal user group selection in multiuser multiple-input-multiple-output (MIMO) downlink transmission.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some initial work on multiple antenna systems may be focused on systems that support single user point-to-point links. However, the use of multi-antenna techniques for a multiuser environment to improve total throughput remains a challenge.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for finding a threshold for semi-orthogonal user group selection in multiuser multiple-input-multiple-output (MIMO) downlink transmission, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for finding a threshold for semi-orthogonal user group selection in a multiuser multiple input multiple output (MIMO) downlink transmission. Various embodiments of the invention may increase the capacity of information that is transmitted from the base station during a given time interval by selecting a subset of mobile terminals, which are to simultaneously receive a signal from the base station. The base station may comprise a plurality of antennas. One of a plurality of signals transmitted to one of the selected plurality of mobile terminals in the subset may be semi-orthogonal to any of a remaining plurality of signals transmitted any of the remaining portion of the selected plurality of mobile terminals. Signals may be considered to be semi-orthogonal if they are neither perfectly correlated or perfectly orthogonal. The group of mobile terminals may be referred to as a semi-orthogonal user group.

Communication systems using multiple antennas at both the transmitter and the receiver have received increased attention due to their promise of providing significant capacity increases in a wireless fading environment. However, many of the pioneering approaches to multiple antenna systems have been restricted to single user point-to-point links. Recently, attention has been focused on improvements in total throughput that may be realized by utilizing multi-antenna techniques in a multiuser environment. A communication from a base station to a mobile terminal, or user, may be referred to as a downlink communication. With multiple antennas installed, the base station may select a group of the users (active users) to transmit their respective data streams simultaneously. The information transfer rate that may be achieved in a downlink communication between the base station in a multiuser environment, comprising a plurality of users, may be equal to a sum of the downlink information transfer rates of the active users. The maximum sum of the downlink transfer rates may be referred to as the sum capacity associated with a plurality of users. A communication from a user to a base station may be referred to as an uplink communication.

In a multiuser communication system, employing multiple antennas at the base station may improve the downlink system capacity. A zero-forcing (ZF) linear precoder may achieve a sum capacity when the number of users, K, approaches infinity. The sum capacity may be based on the number of transmitting antenna that are located at the base station. Furthermore, ZF precoders may provide near-optimal performance even with a limited number of users, for example when K=10.

A base station comprising M antennas may transmit a signal to up to M users simultaneously. When the total number of users K is large, in order to find the optimal group of up to M users to which a corresponding plurality of M simultaneous signals are to be transmitted, the precoder at the base station may search among all possible combinations of K users taken M at a time. Each combination may comprise a subset of users referred to as a user group. The search may find the user group associated with the largest instantaneous sum rate. An existing user group selection algorithm utilizes semi-orthogonal user groups to reduce the number of candidate user groups from $K(K+1)/2$ to $K-1$, for example. The performance of the algorithm may depend upon the choice a threshold parameter, $\alpha$. The threshold parameter may control how "semi-orthogonal" the remaining user candidates should be with respect to the vector space of the selected users.

Figure 1:
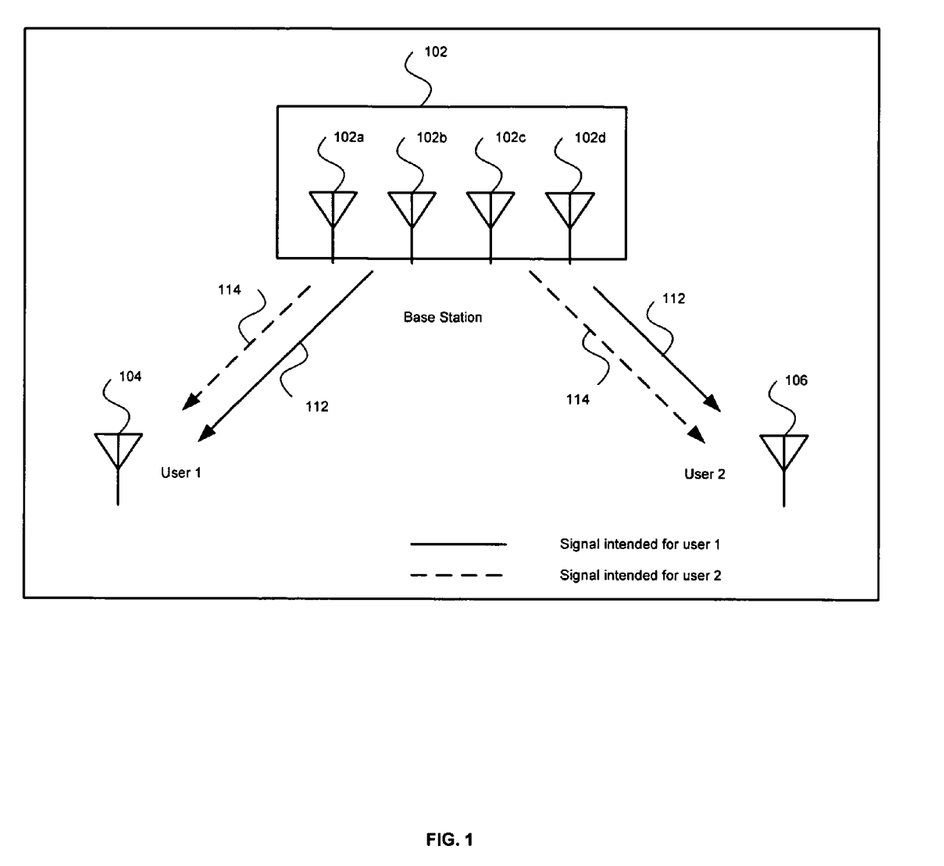
FIG. 1 is a block diagram illustrating an exemplary multiuser base station in a multiuser environment, which may be utilized in connection with an embodiment of the invention.

FIG. 1 is a block diagram illustrating an exemplary multiuser base station in a multiuser environment, which may be utilized in connection with an embodiment of the invention. Referring to FIG. 1, there is shown a base station 102, a first user 104, a second user 106, a signal 112 and a signal 114. The base station 902 may comprise a plurality of antennas 102a, 102b, 102c, and 102d. The base station 102 may utilize antennas 102a-102d to transmit a signal 112. At the same time, the base station 102 may utilize antennas 102a-102d to transmit a signal 114. The signal 112 may comprise information that is intended to be transmitted from the base station 102 to the first user 104. The signal 114 may comprise information that is intended to be transmitted from the base station 102 to the second user 106. The transmitted signals 112 and 114 may be received by the first user 104, and by the second user 106. At the first user 104, the signal 114 may represent an interference signal. At the second user 106, the signal 112 may represent an interference signal. The interference signal may be reduced by utilizing beamforming at the base station 102.

Figure 2:
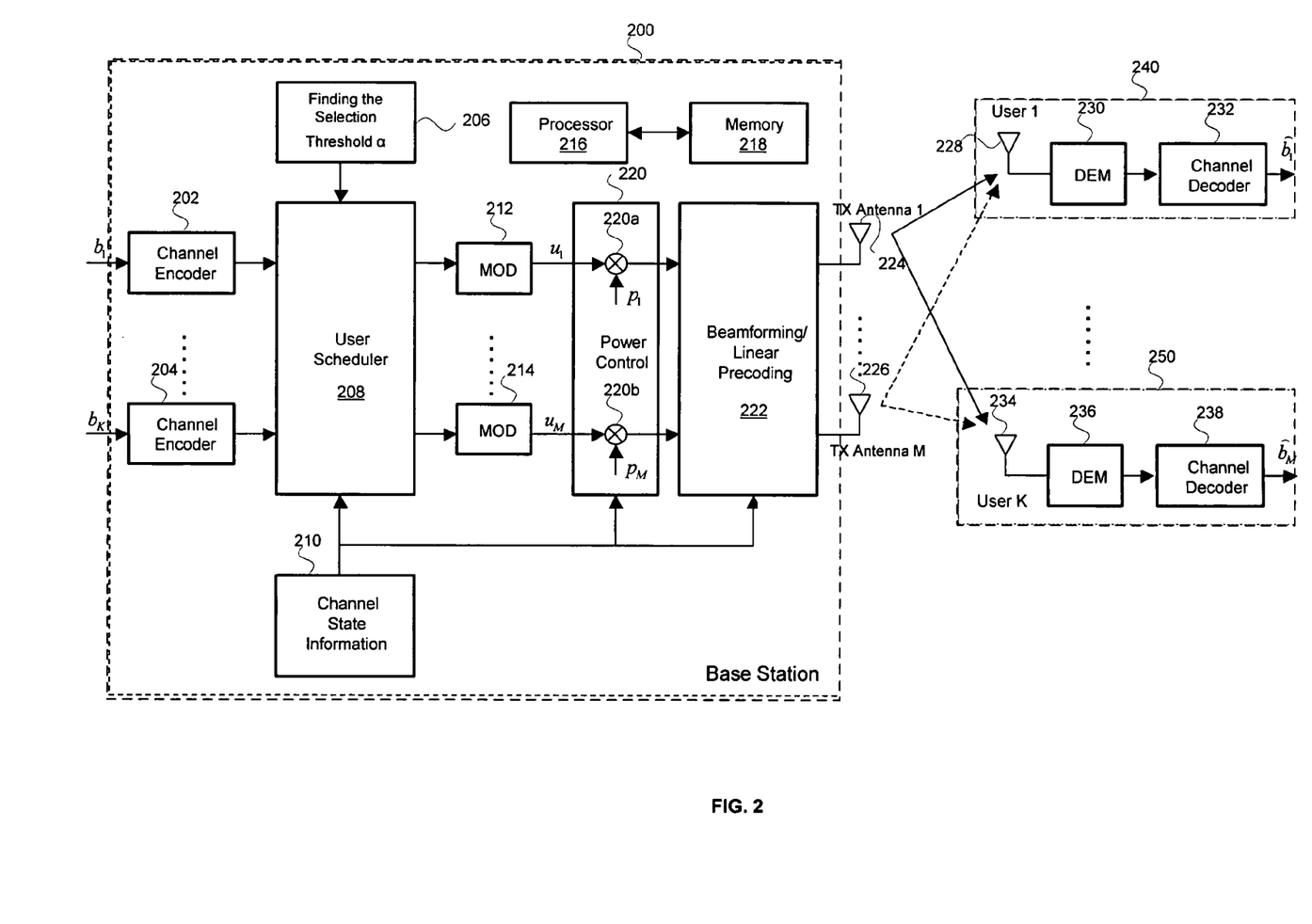
FIG. 2 is a block diagram illustrating an exemplary MIMO base station utilizing semi-orthogonal user group selection, in accordance with an embodiment of the invention.

FIG. 2 is a block diagram illustrating an exemplary MIMO base station utilizing semi-orthogonal user group selection, in accordance with an embodiment of the invention. Referring to FIG. 2, there is shown a base station 200 and a plurality of users 240 . . . 250. The base station 200 may comprise a plurality of channel encoders 202 . . . 204, a threshold selection block 206, a user scheduler 208, a channel station information block 210, a plurality of modulators 212 . . . 214, a processor 216, system memory 218, a power control block 220, a beamforming or linear preceding block 222, a plurality of antennas 224 . . . 226. The power control block may comprise a plurality of multipliers 220a . . . 220b. The user 240 may comprise an antenna 228, a demodulator 230, and a channel decoder 232. The user 250 may comprise an antenna 234, a demodulator 236, and a channel decoder 238.

The channel encoders 202 . . . 204 may comprise suitable logic, circuitry, and/or code that may be adapted to encode binary data associated with as many as K individual information streams. The threshold selection block 206 may comprise suitable logic, circuitry, and/or code that may be adapted to calculate or find a threshold that may be utilized by the user scheduler 208 to perform semi-orthogonal user group selection. The threshold selection block 206 may comprise a processor. The user scheduler 208 may comprise suitable logic, circuitry, and/or code that may be adapted to select a group of M or less than M users that are to receive one of M or less than M signals simultaneously transmitted via an antenna 224 . . . 226. The selected users may be selected by the user scheduler 208 based on a threshold that may be provided by the threshold selection block 206. For example, the user scheduler 208 may select a group of 2 users by using the semi-orthogonal user group selection algorithm wherein the threshold value may be α=0.5. The threshold value may be received from the threshold selection block 206. The group of 2 users may be selected based on a criterion that maximizes the instantaneous rate of information transfer from the base station 200. The channel state information (CSI) block 210 may comprise suitable logic, circuitry, and/or code that may be adapted to provide channel state information of a plurality of users 240 ... 250. The channel state information of a plurality of users 240 ... 250 may be obtained by uplink channel estimation in a time division duplex (TDD) system or by CSI feedback received from the users through a dedicated feedback link in a frequency division duplex (FDD) system.

The modulators 212 ... 214 may comprise suitable logic, circuitry, and/or code that may be adapted to modulate the binary data of each of the users selected by the user scheduler 208. In this regard, the modulation operation on the binary data may result in a plurality of complex symbols $u_1 \ldots u_M$, for example. The power control block 220 may comprise suitable logic, circuitry, and/or code that may be adapted to allocate different power levels, $p_1 \ldots p_M$, to complex symbols $u_1 \ldots u_M$ received from the modulation blocks 212 ... 214, for example. The power level associated with each of the signals received from a modulator 212 ... 214 $u_1 \ldots u_M$ may be scaled by a multiplier block 220a ... 220b. The scaling may produce a plurality of power level adjusted user data symbols $p_1 u_1 \ldots p_1 u_1$. Each of the power level adjusted user data symbols $p_1 u_1$, where i is an integer whose value is between 1 and M inclusive, may be referred to as a spatial stream.

The beamforming or linear precoding block 222 may comprise suitable logic, circuitry, and/or code that may be adapted to process spatial streams and to separate signals intended for different users such that each of the users 240 receives little or no interference from signals intended for other users 250. With M antennas at the base station 200, the beamforming and linear precoding block 222 may separate up to M different signals, which the base station 200 may transmit simultaneously via the antennas 224 ... 226. The signal transmitted via antenna 224 may comprise signal contributions from the plurality of spatial streams. For example, the signal transmitted via antenna 224, $x_1$ may be represented as $x_1 = a_1 p_1 u_1 + \ldots + m_1 p_M u_M$. The constants $a_1$ and $m_1$ represent weighting factors utilized by the beamforming or linear precoding block 222 when forming the signal transmitted by the antenna 224. The signal transmitted via antenna 226, $x_M$, may be represented as $x_M = a_M p_1 u_1 + \ldots + m_M p_M u_M$, for example. The constants $a_M$ and $m_M$ represent weighting factors utilized by the beamforming or linear precoding block 222 when forming the signal transmitted by the antenna 226. The beamforming or linear precoding block may be referred to as a precoder.

The processor 216 may comprise suitable logic, circuitry, and/or code that may be adapted to process information and/or data associated with the generation of transmission signals at the base station 200. The processor 216 may, for example, determine the values of parameters that control the operation of the threshold selection block 206. For example, the processor 216 may determine a threshold value that is utilized by the threshold selection block 206 to select users 240 ... 250 to be included in a user group. The memory 218 may comprise suitable logic, circuitry, and/or code that may be utilized to store data and/or control information that may be utilized in the operation of at least a portion of the base station 200. For example, the memory 218 may be utilized to store information that identifies users 240 ... 250 that have been included in a user group.

The user scheduler 208, the power control block 220, and/or the beamforming or linear precoding block 222 may require knowledge of the state of the downlink channel. The CSI block 210 may be adapted to transfer the channel state information to the user scheduler 208, the power control block 220, and/or the beamforming or linear precoding block 222. This does not exclude other functional blocks within the base station 200, for example the threshold selection block 206 and/or the processor 216, from utilizing channel state information.

The user 240 may receive at least a portion of the signals transmitted by the base station 200 via the antenna 228. The demodulator 230 may comprise suitable logic, circuitry, and/or code that may be adapted to demodulate the signals received from the base station 200, for example. The channel decoders 232 may comprise suitable logic, circuitry, and/or code that may be adapted to decode the demodulated signals from the demodulators 230 into binary bit streams, for example. The user 240 may receive at least a portion of the signals transmitted by the base station 200 via the antenna 234. The demodulator 236 may comprise suitable logic, circuitry, and/or code that may be adapted to demodulate the signals received from the base station 200, for example. The channel decoders 238 may comprise suitable logic, circuitry, and/or code that may be adapted to decode the demodulated signals from the demodulators 236 into binary bit streams, for example.

In operation, the base station 200 comprising M antennas 224 ... 226, may transmit a signal to each of a plurality of M users 240 ... 250 simultaneously. A selected plurality of M users 240 ... 250 may represent a user group, comprising a subset, selected from a plurality of K total users. The sum capacity associated with a first selected plurality of M users may be greater than the sum capacity associated with a second selected plurality of, $p_1 \ldots p_M$ users, for example. In this case, the first selected plurality of M users may be considered to be an optimal group in comparison to the second selected plurality of M users. When the total number of users K is large compared to the number M, the number of potential groups of users, or subsets, may be large. Each subset may comprise a unique combination of M users selected from the total number of K users. To find the optimal group of users to which the base station 200 may simultaneously transmit signals, the precoder 222 may search all potential subsets, among the total number of K users, to find the one with the largest instantaneous sum rate. The search range, in this case, may be K. The complexity of the search algorithm may increase dramatically with increasing values of K.

Various embodiments of the invention may comprise a threshold selection block 206, which may select a threshold value that may be utilized by the user scheduler 208 to select only semi-orthogonal users. The criteria for evaluating selection of users in a user group may be the degree of orthogonality between a first user 240 and a second user 250. The degree of orthogonality may be computed based on channel measurements. The first user 240 may be the strongest user among the total number of K users. The criteria for evaluating the strength of any of the K users may utilize a signal gain measurement, wherein a first user 240 may be considered stronger than a second user 250 when the signal gain associated with the first user 240 is greater than the signal gain associated with the second user 250. Channel measurement and/or signal gain information may be based on information retrieved from the CSI block 210.

A threshold value may be utilized when selecting users for inclusion in the semi-orthogonal user group. Signals associated with a semi-orthogonal user 240 may suffer less loss in effective channel gain after zero-forcing linear precoding from signals associated with other semi-orthogonal users 250 within the user group than would from signals associated with users not within the user group. The selection of semi-orthogonal user groups may increase the sum capacity simultaneously transmitted by the base station 200. The base station 200 may transmit a signal to the strongest user 240 in the user group. The base station 200 may transmit a signal to a subsequent user 250 in the user group based on criteria, such as signal strength associated with the subsequent user 250 and/or orthogonality relative to the strongest user 240, for example. Various embodiments of the invention may comprise a method and a system for determining a value for the threshold value $\alpha$.

At the base station 200, a plurality of signals $x_1 \ldots x_M$ may be transmitted by a corresponding plurality of antenna 224 ... 226. A corresponding plurality of signals $y_1 \ldots y_K$ may be received by each of a corresponding subset of users in a semi-orthogonal user group. Each of the received signals $y_1 \ldots y_M$ may comprise a contribution from a plurality of transmitted signals $x_1 \ldots x_M$. For example, the signal received by a first user 240, $y_1$, may be represented $y_1 = h_{11}x_1 + \ldots + h_{1M}x_M$. The plurality of transmitted signals $x_1 \ldots x_M$ and received signals $y_1 \ldots y_M$ as shown in FIG. 2 may be expressed in a signal model utilizing matrix notation. The signal model may be specified using the following expression:

$$\begin{bmatrix} y_1 \\ y_2 \\ \vdots \\ y_k \end{bmatrix} = \begin{bmatrix} h_1 \\ h_2 \\ \vdots \\ h_k \end{bmatrix} x + n \tag{1}$$

where $y_k$ ($k=1, \ldots, K$) may represent the received signal by user $k$, $h_k \in \mathbb{C}^{1 \times M}$ may represent the channel vector to user $k$, $x \in \mathbb{C}^{k \times 1}$ may represent the transmitted symbol vector by the base station, and $n \in \mathbb{C}^{k \times 1}$ may represent additive white Gaussian noise (AWGN). The AWGN may be characterized as comprising a zero mean value and unit variance. The transmitted symbols may satisfy a power constraint, $E[x^H x] \leq P$ where $(\bullet)^H$ may represent a complex conjugate transpose of the matrix $(\bullet)$.

Each element in $h_k$ may represent a zero-mean circularly symmetric complex Gaussian (ZMCSCG) random variable with unit variance. Signals received by each of the users 240 may experience independent fading, hence the plurality of channel vectors $\{h_k\}_{k=1}^K$ may each be statistically independent. The channel state information (CSI), $h_k$, may be assumed to be perfectly known to user k, but not to other users. The base station 200 may have perfect knowledge of each user's channel.

In multiuser communication systems, employing multiple antennas at the base station 200 may improve downlink system capacity. The capacity improvement may be attained by communicating simultaneously with multiple users 240 ... 250, utilizing precoding at the transmitter when channel state information (CSI) is available. Dirty paper coding (DPC) is a precoding scheme that may achieve a sum capacity, but the complexity of DPC may limit the ability to implement systems utilizing the precoding scheme. There may also exist other suboptimal, but relatively low complexity schemes for multiuser MIMO downlink transmission, such as linear precoding, Tomlinson-Harashima precoding (THP), and vector encoding, for example.

A zero-forcing (ZF) linear precoder may achieve the sum capacity when combined with infinite-order multiuser diversity when, for example, the number of users K approaches infinity. Furthermore, ZF precoders may provide near-optimal performance even when the number of users is not infinite, for example when K=10. One aspect of the invention may refer to the utilization of zero-forcing precoders in a multiuser environment. Various embodiments of the invention may not be limited to ZF precoders, however. Embodiments of the invention may also be applied to a plurality of precoding schemes that utilize multiuser diversity.

Zero-forcing precoders are a specific type of linear precoders. When the base station 200 selects a group of users to which a signal x may be transmitted, wherein the group of users may comprise $D \subset \{1, \ldots, K\}$ with $d=|D| \leq K$, a linear precoding scheme may linearly weigh the data symbols, $s=[s_1, \ldots, s_d]^T$, before they are transmitted from the base station according to the following expression:

$$x = FPs, \tag{2}$$

where x may represent the transmitted signal vector as in (1), $F=[f_1, \ldots, f_d]$ may represent the M×d linear precoding matrix with normalized columns ($\|f_k\|=1$), and $P=\text{diag}\{P_1, \ldots, P_d\}$ with $$\sum_{i=1}^{d} P_i \leq P$$

may represent the power control matrix that allocates transmit power to different users. The data symbols s may correspond to the data symbols $u_1 \ldots u_M$ that are generated by the plurality of modulators 212 ... 214. The elements in the linear precoding matrix F may represent the plurality of weighing coefficients utilized by the precoder 222. The nonzero elements in the diagonal matrix P may represent the plurality of scaling factors $p_1 \ldots p_M$ utilized by the power control block 220. The plurality of received signals y may be represented as in the following expression:

$$\begin{bmatrix} y_1 \\ y_2 \\ \vdots \\ y_d \end{bmatrix} = \begin{bmatrix} h_1 \\ h_2 \\ \vdots \\ h_d \end{bmatrix} FPs + n \tag{3}$$

A zero-forcing precoder 222, may utilize a pseudo-inverse of a channel matrix $H_D=[h_1^T, \ldots, h_d^T]^T$ as a weighting matrix when $H_D$ has full row rank, for example, when:

$$W_D = H_D^\dagger = H_D^H (H_D H_D^H)^{-1} \tag{4}$$

$$F_D = W_D \begin{bmatrix} \frac{1}{w_1} & & \\ & \ddots & \\ & & \frac{1}{w_d} \end{bmatrix} \tag{5}$$

where $\{w_i\}_{i=1}^d$ are the column of $W_D$.

By defining:

$$\xi_i \triangleq \frac{1}{w_i} \quad (6)$$

and substituting (5) to (3), an equation representing the received signal may be obtained for each user when zero-forcing precoding is utilized as in the following expression:

$$y_i = \xi_i P_i s_i + n_i, \ \forall i \in D. \quad (7)$$

Thus, the multiuser downlink channel may be represented as a set of parallel channels. The maximum sum rate for a given user group D may be represented as in the following expression:

$$C_D = \sum_{i \in D} \log(1 + \xi_i P_i), \quad (8)$$

where the sum $C_D$ in (8) may represent a sum rate associated with a single group of M users 240 selected from a range of K users. The optimal value $P_i$ may be determined base on a water-filling solution as in the following expression:

$$P_i = \left(\mu - \frac{1}{\xi_i}\right)^+, \quad (9)$$

where the water level µ may be selected to satisfy the condition $$\sum_{i \in D} \left(\mu - \frac{1}{\xi_i}\right)^+ = P.$$

The maximum achievable sum rate for a given channel realization may thus be obtained by searching over all the possible user groups are represented as in the following expression:

$$C = \max_{D \subseteq \{1,\ldots,K\}, |D| \leq M} C_D. \quad (10)$$

where C in (10) may represent a maximum value of $C_D$ derived from a plurality of groups of M users selected from the reduced range of K users. A channel realization may comprise a selected set of channels, for example M, by which the base station 200 may simultaneously transmit information to selected users within a user group.

According to (10), for a given channel realization, the optimal brute-force user group selection for ZF precoding may require searching over all $$\sum_{i=1}^{M} \binom{K}{i}$$

possible user groups to find the one with the largest sum rate. In addition, for each candidate user group, a water-filling solution needs to be computed to obtain the corresponding sum rate. Thus a fairly high computational cost is to be expected, especially when K is large.

An existing user group selection algorithm utilizes semi-orthogonal user groups to reduce the number of candidate user groups from K(K+1)/2 to K−1. The figure of merit used in the existing user group selection algorithm is the "angle" between the multiple-input-single-output (MISO) channel vectors associated with two users. The semi-orthogonal user group selection algorithm may be summarized as in the following steps:

Initialization: Initialize $\epsilon_i = \{1, \ldots, K\}$, $D_{opt} = \emptyset$, i=1, and the threshold $0 \leq \alpha \leq 1$.

Step I: For each user $k \in \epsilon_i = \{1, \ldots, K\}$, calculate $$h_k^\perp = h_k \sum_{j=1}^{i-1} \frac{g_j^H g_i}{\|g_j\|^2}$$

Step II: Select the $i^{th}$ user as follows:

$$d_i = \arg\max_{k \in \epsilon_i} \|h_k^\perp\|,$$

$$D_{opt} = D_{opt} \cup d_i,$$

$$g_i = h_{d_i}^\perp.$$

Step III: If $|D_{opt}| < M$, then $$\epsilon_i + 1 = \left\{k \in \epsilon_i, k \neq d_i \frac{|h_k g_i^H|}{\|h_k\| \cdot \|g_i\|} < \alpha\right\}, i = i + 1,$$

Step I may follow each instance of step III until the condition $|D_{opt}| = M$ is met.

The threshold parameter α may control how "semi-orthogonal" the remaining user candidates should be with respect to the vector space of the selected users. For example a value of the threshold parameter $\alpha \approx 0$ may indicate that the selected users i in the user group are perfectly orthogonal to the user k. This may comprise an orthogonal user group. Conversely, a value of the threshold parameter $\alpha \approx 1$ may indicate that the selected users in the user group will even include users i that are perfectly correlated to the user k, for example. This may represent a user group that comprises the total number of K users.

With reference to the group selection algorithm above, at each step, those remaining users that are not "orthogonal" enough to the selected users may be removed from the candidates list for values of $0 \leq \alpha < 1$. If α is too small, too many candidates may be eliminated, which may reduce the likelihood of finding a good user group. If α is too large, the likelihood of choosing two correlated users may increase, and thus reduce the sum rate. One aspect of the invention may comprise a heuristic that may be utilized to find a good value for α.

The choice of α may influence the performance of the zero-forcing precoding scheme. An analysis of the influence of the choice of α may comprise performing a brute-force simulation to search over all possible values of α for a optimal choice. Various embodiments of the invention may comprise a scheme to reduce the complexity of searching for a good choice of α.

An exemplary embodiment of the invention may comprise a system with M=2 antennas at the base station and K=100 users, each equipped with a single antenna. For each channel realization $\{h_k\}_{k=1}^K$, in order to maximize the sum rate, the base station select the optimal user group according to (10) by brute-forcing search. In the following expression:

$$X = \frac{|h_i h_j^H|}{\|h_i\| \cdot \|h_j\|}, \; i, j \in D_{opt} \tag{11}$$

where X may represent a normalized absolute value of an inner product between a user i and a user j. When the user i and the user j are perfectly orthogonal, the numerator of (11), which may represent the absolute value of the inner product between the users, may be about equal to 0. Therefore, in this case, the value X may be about equal to 0. When the user i and the user j are perfectly correlated, the numerator of (11), may be about equal to the multiplicative product of the individual magnitudes associated with the users i and j respectively. Since the numerator of (11) may represent the multiplicative product of the individual magnitudes associated with the users i and j respectively, in this case the value X may be about equal to 1. In many cases, the value of X may be greater than 0 but less than 1.

Figure 3:
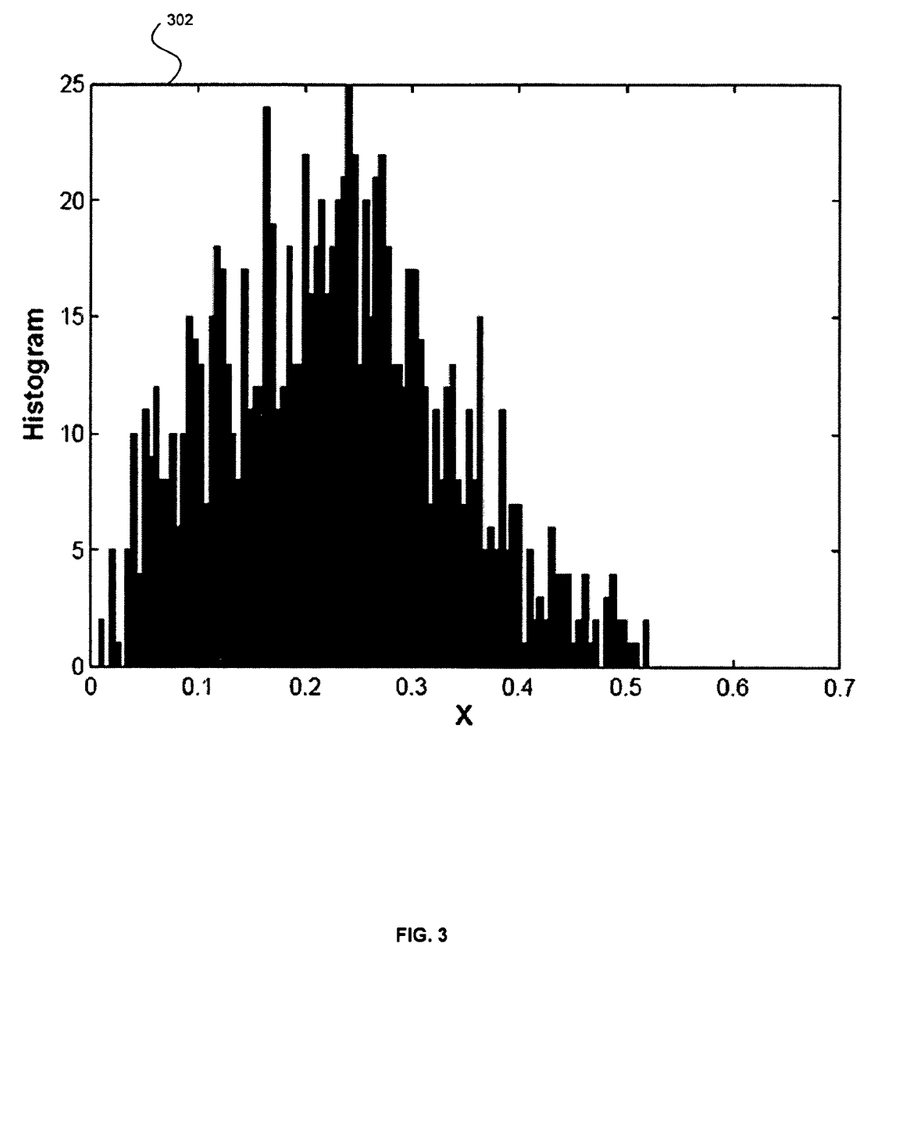
FIG. 3 is a histogram representation of indexes for optimal users compiled from 1000 random channel realizations, which may be utilized in connection with an embodiment of the invention.

FIG. 3 is a histogram representation of indexes for optimal users compiled from 1000 random channel realizations, which may be utilized in connection with an embodiment of the invention. Referring to FIG. 3, there is shown a histogram 302. The histogram 302 comprises a plurality of values of orthogonality measures, X, and represents a number of instances in which each value of X occurs in the total 1000 channel realizations comprising a first user 240 and a second user 250. For example, a value of the orthogonality measurement X about equal to 0.2 may occur in about 25 times in the total 1000 channel realizations, for example. A value of the orthogonality measurement X about equal to 0.5 may occur less than 5 times, for example.

Figure 4:
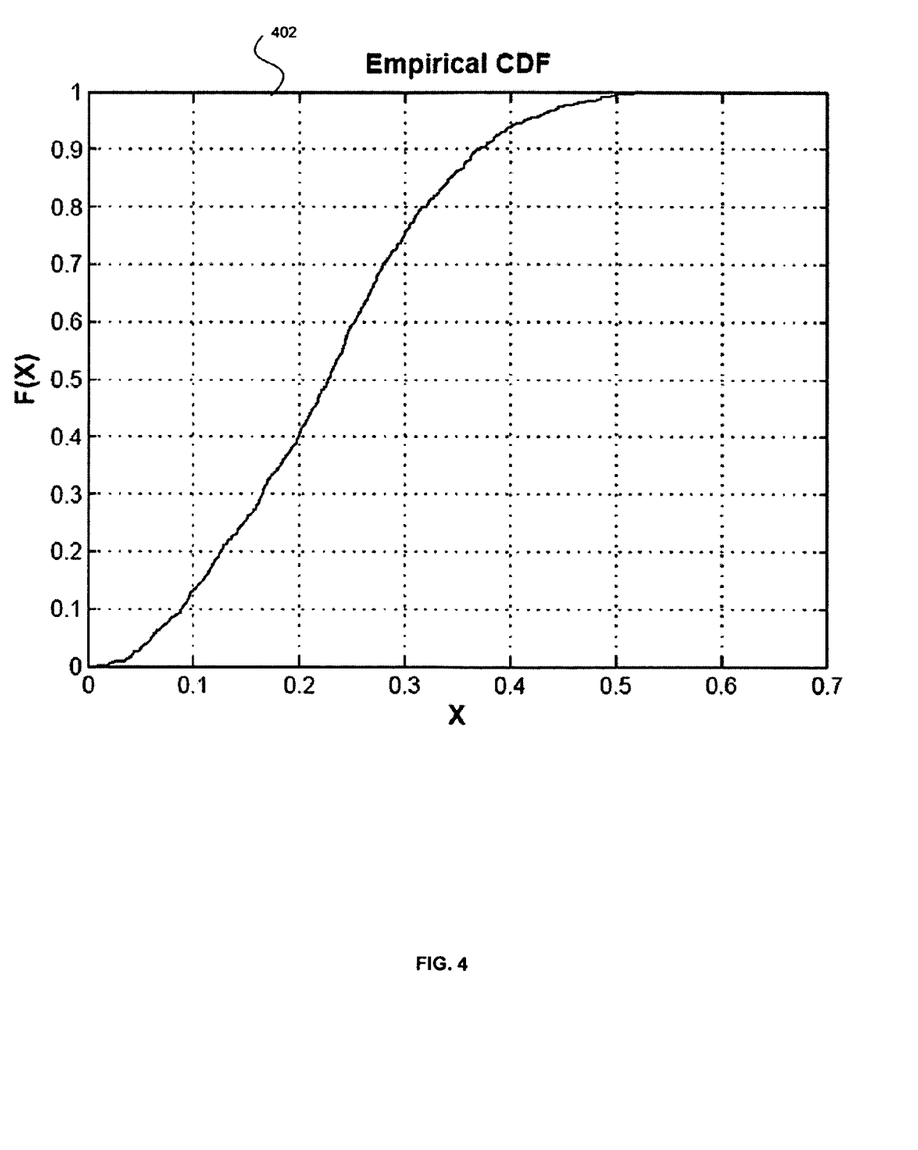
FIG. 4 is an empirical cumulative distribution function (CDF), which may be utilized in connection with an embodiment of the invention.

FIG. 4 is an empirical cumulative distribution function (CDF), which may be utilized in connection with an embodiment of the invention. Referring to FIG. 4, there is shown a cumulative distribution function (CDF) 402. The CDF comprises a plurality of values of the orthogonality measurement X, and represents the probability that a value less than or equal to the indicated value of X may occur in a channel realization comprising a first user 240 and a second user 250. For example, for a value X about equal to 0.5, there is about a 100% likelihood that a value of X less than or equal to about 0.5 may occur in a channel realization. If X=0.5 is utilized as a threshold value, there may be about a 100% likelihood that a selected semi-orthogonal user group may comprise an optimal user group. Consequently, there may be about a 0% likelihood that the optimal user group will not be selected when utilizing X=0.5 as a threshold value. An optimum user group may comprise a subset of users 240 that are associated with a maximum sum rate.

Figure 5:
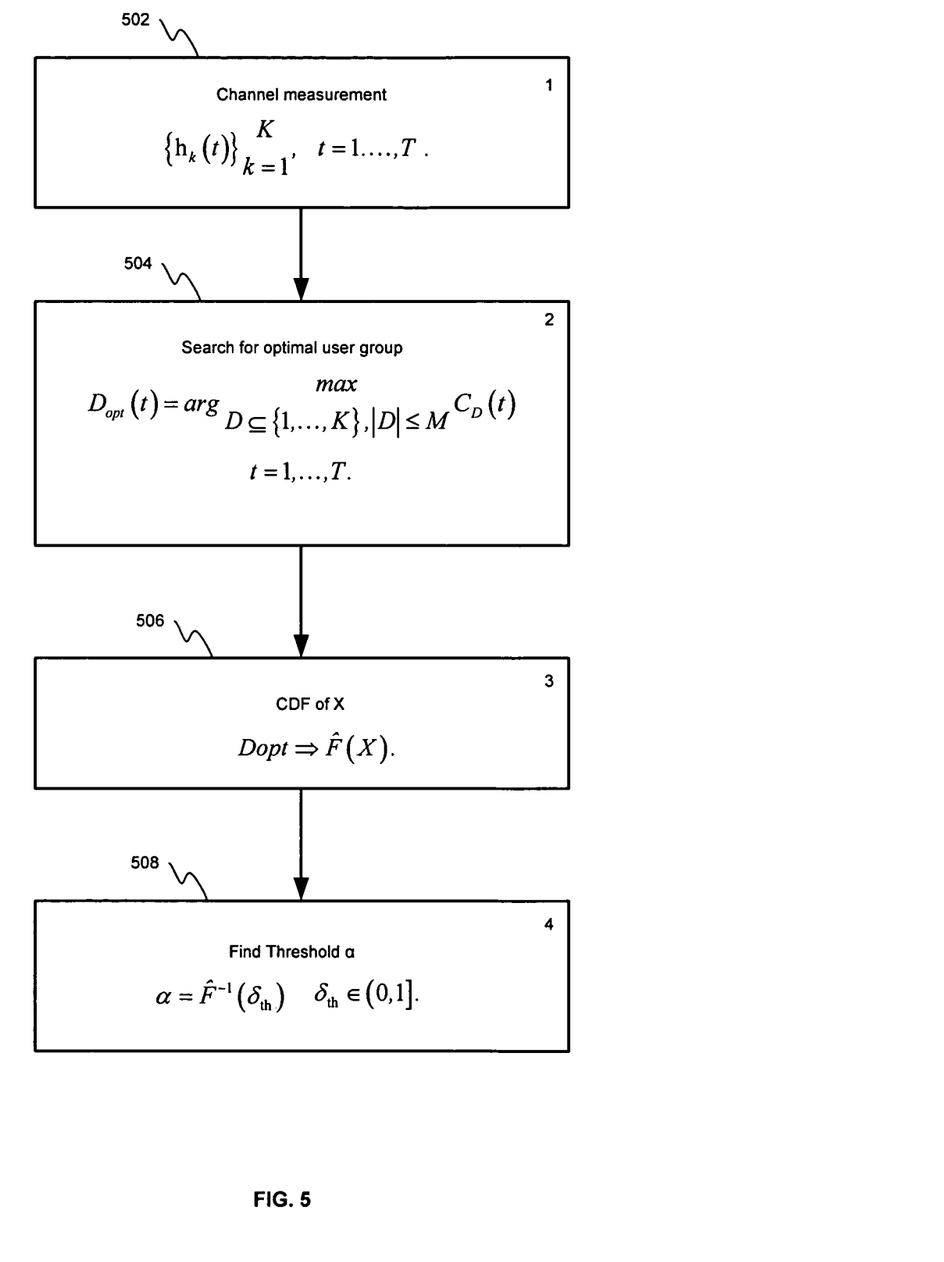
FIG. 5 is a flow chart that illustrates exemplary steps in a method for semi-orthogonal user group selection in multiuser MIMO downlink transmission, in accordance with an embodiment of the invention.

FIG. 5 is a flow chart that illustrates exemplary steps in a method for semi-orthogonal user group selection in a multiuser MIMO downlink transmission, in accordance with an embodiment of the invention. Referring to FIG. 5, in step 502, channel state information (CSI) may be derived, step 504 comprise a search for optimal users, step 506 may comprise computing a cumulative distribution function (CDF) among values of the orthogonality measurement X, and step 508 may comprise selecting a threshold value.

In step 502 CSI may be derived based on a plurality of T independent channel realizations, for example:

$$\{h_k(t)\}_{k=1}^K, \; t=1, \ldots, T. \tag{12}$$

The CSI may comprise channel gain, or signal gain, information. For each channel realization, users among the full set of K users may be sorted, and indexed, in an order based on the values of the channel gains corresponding to each of the K users. For example, a user with a larger value of corresponding channel gain may be placed in the sorted list at a higher index than a user with a smaller value of corresponding channel gain as in the following expression:

$$\gamma_1(t) \geq \gamma_2(t) \ldots \geq \gamma_K(t), \; t=1, \ldots, T, \tag{13}$$

where $\gamma_k(t) \triangleq \|h_k(t)\|^2$.

The channel measurement may be carried out either by offline channel sounding or by online channel estimation. In a time division duplex (TDD) system, the base station may compute a channel estimate associated with an uplink channel, and use the uplink channel estimation as an approximation of channel estimates for the corresponding downlink channel based on a channel reciprocity property between the uplink and downlink channels. In a frequency division duplex (FDD) system, the reciprocity property may not be utilized. Thus, the downlink CSI may be estimated by the users 240 . . . 250 and subsequently communicated to the base station 200 via a dedicated feedback link.

In step 504, for each of the channel realizations according to (12), the optimal user group may be determined according to (8) and (10) as in the following expression:

$$D_{opt}(t) = \arg\max_{D \subseteq \{1, \ldots, K\}, |D| \leq M} C_D(t), \; t=1, \ldots, T, \tag{14}$$

where:

$$C_D(t) = \sum_{i \in D} \log(1 + \varepsilon_i(t) P_i(t)), \tag{15}$$

and where $\varepsilon_i(t)$ and $P_i(t)$ may be as defined in (6) and (9), respectively. For each user pair (i, j), representing a user i and a user j, in the optimal group $D_{opt}(t)$, the corresponding normalized inner product may be computed as in the following expression:

$$X_{ij}(t) = \frac{|h_i h_j^H|}{\|h_i\| \cdot \|h_j\|}, \; \forall \, i, j \in D_{opt}(t), \; =1, \ldots, T, \tag{16}$$

where each computed normalized inner product $X_{ij}(t)$ may be stored in a set $\chi$:

$$\chi \leftarrow X_{ij}(t).$$

and where the set $\chi$ may comprise a plurality of samples of X.

In step 506, an estimate of the cumulative distribution function (CDF) $\hat{F}(X)$ of X may be produced based on samples from the normalized inner product, X, that was determined in step 504 according to (16).

In step 508, a threshold, $\delta_{th} \in (0,1]$, may be selected. The reduced search range then may be determined by the relationship as in the following expression:

$$\alpha = \hat{F}^{-1}(\delta_{th}), \tag{17}$$

where $\hat{F}^{-1}(\bullet)$ is the inverse function of $\hat{F}(\bullet)$, for example:

$$X = \hat{F}^{-1}(\hat{F}(X))$$

In various embodiments of the invention, expression (17) may be implemented by tabulating the CDF $\hat{F}(X)$ in terms of the random variable comprising the value of the normalized inner product X, and searching for a value of X that corresponds to $\delta_{th}$. The threshold $\delta_{th}$ may be chosen to be a value that is about equal to 1.

While the exemplary embodiment of the invention illustrates a threshold selection scheme in a system that utilizes a simple zero-forcing precoder, the invention is not so limited. Various embodiments of the invention may also be utilized with other more sophisticated precoders, for example a minimum mean squared error (MMSE) precoder, a Tomlinson-Harashima preceding (THP) precoder, or a sphere encoding precoder, for example. Various embodiments of the invention may not be limited to MIMO systems in which the base station 200 comprises M=2 antennas. Various embodiments of the invention may also comprise base stations 200 that comprise greater than 2 antennas. In the general case, the user group may comprise a plurality of mutually semi-orthogonal users 240.

Figure 6:
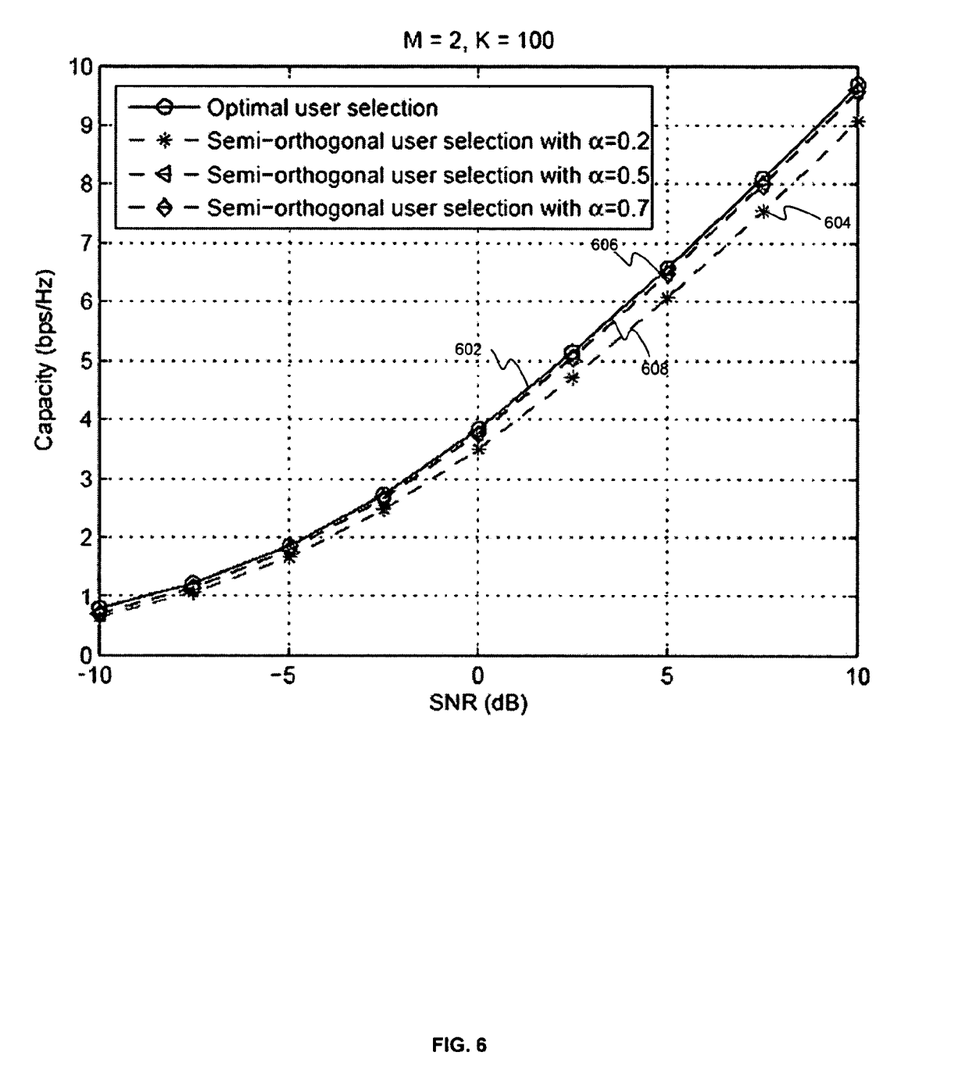
FIG. 6 is a graph illustrating exemplary capacity performance associated with various downlink transmission schemes, in accordance with an embodiment of the invention.

FIG. 6 is a graph illustrating exemplary capacity performance associated with various downlink transmission schemes, in accordance with an embodiment of the invention. The chart may be based on exemplary conditions in which the total number of users K=100 and the number of transmitting antenna at the base station M=2. Each user 240 may comprise a single receiving antenna 228. The channels for each channel realization may be generated to be flat Rayleigh faded channels. The transmit antennas 224 . . . 226 at the base station 200 may be spread so that individual channels may experience fading that is independent of the fading in other channels. The modulation format utilized may be quaternary phase shift keying (QPSK).

Referring to FIG. 6, there is shown a graph illustrating exemplary capacity performance of a downlink scheme corresponding to optimal user selection, 602, a graph illustrating the capacity performance of a downlink scheme in which the threshold value $\alpha$=0.2, 604, a graph illustrating the capacity performance of a downlink scheme in which the threshold value $\alpha$=0.5, 606, and a graph illustrating the capacity performance of a downlink scheme in which the threshold value $\alpha$=0.7, 608. In the graph 602, the user group may comprise the entire set of K=100 users. In the graph 604, the user group may comprise semi-orthogonal users 240 wherein the threshold measurement of orthogonality is about equal to 0.2. The capacity performance associated with the threshold $\alpha$=0.2 graph 604 may be significantly less than the capacity performance of the optimal user selection 602. The capacity performance comparison may represent a sum rate comparison. The reduced sum rate performance associated with the graph 604 may indicate that the threshold value $\alpha$=0.2 may be too small. The capacity performance associated with the threshold $\alpha$=0.5 graph 606 may be substantially equal to the capacity performance of the optimal user selection 602. The capacity performance associated with the threshold $\alpha$=0.7 graph 608 may be substantially equal to the capacity performance of the optimal user selection 602.

Figure 7:
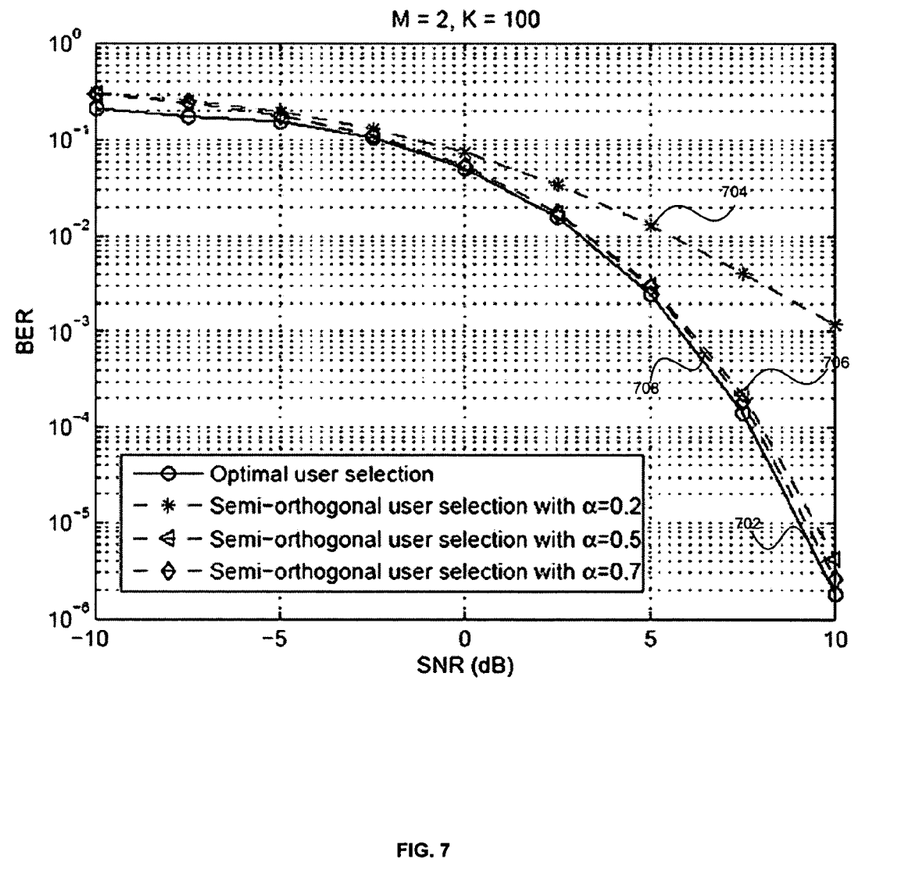
FIG. 7 is a graph illustrating exemplary bit error rate (BER) performance associated with various downlink transmission schemes, in accordance with an embodiment of the invention.

FIG. 7 is a graph illustrating exemplary bit error rate (BER) performance associated with various downlink transmission schemes, in accordance with an embodiment of the invention. The chart may be based on exemplary conditions in which the total number of users K=100 and the number of transmitting antenna at the base station M=2. Each user 240 may comprise a single receiving antenna 228. The channels for each channel realization may be generated to be flat Rayleigh faded channels. The transmit antennas 224 . . . 226 at the base station 200 may be placed at a sufficient distance that individual channels may experience fading that is independent of the fading in other channels. The modulation format utilized may be quaternary phase shift keying (QPSK).

Referring to FIG. 7, there is shown a graph illustrating exemplary BER performance of a downlink scheme corresponding to optimal user selection, 702, a graph illustrating the BER performance of a downlink scheme in which the threshold value $\alpha$=0.2, 704, a graph illustrating the BER performance of a downlink scheme in which the threshold value $\alpha$=0.5, 706, and a graph illustrating the BER performance of a downlink scheme in which the threshold value $\alpha$=0.7, 708. In the graph 702, the user group may comprise the entire set of K=100 users. In the graph 704, the user group may comprise semi-orthogonal users 240 wherein the threshold measurement of orthogonality is equal to about 0.2. The BER performance associated with the threshold $\alpha$=0.2 graph 704 may be significantly less than the BER performance of the optimal user selection 702. The reduced BER performance associated with the graph 704 may indicate that the threshold value $\alpha$=0.2 may be too small. The BER performance associated with the threshold $\alpha$=0.5 graph 706 may be substantially equal to the BER performance of the optimal user selection 702. The BER performance associated with the threshold $\alpha$=0.7 graph 708 may be substantially equal to the BER performance of the optimal user selection 702.

A system for communicating information in a communications system may comprise a threshold selection processor 206 that computes an orthogonality measurement between one of a plurality of signals, in multiuser multiple-input-multiple-output wireless communications system, and at least one of a remaining portion of the plurality of signals. The threshold selection processor 206 may compare each of the orthogonality measurements to a threshold orthogonality value whose value may be based on a computed probability. The user scheduler processor 208 may select a user group, based on the threshold orthogonality value, comprising one of the plurality of signals and one or more signals selected from the remaining portion of the plurality of signals. The user scheduler processor 208 may compute a subsequent orthogonality measurement between a current signal selected the remaining portion of said plurality of signals and one or more subsequent signals selected from the remaining portion of said plurality of signals. One or more values may be computed based on at least a portion of a plurality of channel measurements corresponding to one of the plurality of signals and the one or more signals selected from the remaining portion of the plurality of signals. The orthogonality measurement may be computed based on the computed one or more values.

The threshold selection processor 206 may compute a number of instances in which each of the computed one or more value occurs. A cumulative distribution function may be computed based on a plurality of the number of instances corresponding to each of the computed one or more values. The threshold orthogonality value may be selected based on the cumulative distribution function. The threshold selection processor 206 may select the user group comprising one of the plurality of signals and at least one signal selected from the remaining portion of the plurality of signals based on the threshold orthogonality value. The threshold selection processor 206 may compute an information transfer rate associated with each of the one of the plurality of signals and the one or more signals selected from the remaining portion of the plurality of signals selected in the user group. The threshold selection processor 206 may select the one of the plurality of signals, and/or the one or more signals selected from the remaining portion of the plurality of signals, based on at least one corresponding channel gain measurement.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communications system, the method comprising:
   computing an orthogonality measurement between one of a plurality of signals, in a multiuser multiple-input-multiple-output wireless communications system, and at least one of a remaining portion of the plurality of signals;
   comparing the orthogonality measurement to a threshold orthogonality value based on a computed probability; and
   selecting a user group, based on the threshold orthogonality value, comprising the one of the plurality of signals and at least one signal selected from the remaining portion of the plurality of signals.

2. The method according to claim 1, further comprising computing a subsequent orthogonality measurement between a current signal selected from the remaining portion of the plurality of signals and at least one subsequent signal selected from the remaining portion of the plurality of signals.

3. The method according to claim 1, further comprising computing at least one value based on at least a portion of a plurality of channel measurements corresponding to the one of the plurality of signals and the at least one signal selected from the remaining portion of the plurality of signals.

4. The method according to claim 3, comprising computing the orthogonality measurement based on the computed at least one value.

5. The method according to claim 3, further comprising computing a number of instances in which each of the computed at least one value occurs.

6. The method according to claim 5, further comprising computing a cumulative distribution function based on a plurality of the number of instances corresponding to each of the computed at least one value.

7. The method according to claim 6, comprising selecting the threshold orthogonality value based on the cumulative distribution function.

8. The method according to claim 7, comprising selecting the user group based on the threshold orthogonality value.

9. The method according to claim 1, further comprising computing an information transfer rate associated with each of the one of the plurality of signals and the at least one signal selected from the remaining portion of the plurality of signals selected in the user group.

10. The method according to claim 1, further comprising selecting one of: the one of the plurality of signals, and the at least one signal selected from the remaining portion of the plurality of signals, based on at least one corresponding channel gain measurement.

11. A system for communicating information in a communications system, the system comprising:
   a processor configured to compute an orthogonality measurement between one of a plurality of signals, in a multiuser multiple-input-multiple-output wireless communications system, and at least one of a remaining portion of the plurality of signals; and further configured to:
   compare the orthogonality measurement to a threshold orthogonality value based on a computed probability; and
   select a user group, based on the threshold orthogonality value, comprising the one of the plurality of signals and at least one signal selected from the remaining portion of the plurality of signals.

12. The system according to claim 11, wherein the processor is further configured to compute a subsequent orthogonality measurement between a current signal selected from the remaining portion of the plurality of signals and at least one subsequent signal selected from the remaining portion of the plurality of signals.

13. The system according to claim 11, wherein the processor is further configured to compute at least one value based on at least a portion of a plurality of channel measurements corresponding to the one of the plurality of signals and the at least one signal selected from the remaining portion of the plurality of signals.

14. The system according to claim 13, wherein the processor is configured to compute the orthogonality measurement based on the computed at least one value.

15. The system according to claim 13, wherein the processor is further configured to compute a number of instances in which the computed at least one value occurs.

16. The system according to claim 15, wherein the processor is further configured to compute a cumulative distribution function based on a plurality of the number of instances corresponding to the computed at least one value.

17. The system according to claim 16, wherein the processor is configured to select the threshold orthogonality value based on the cumulative distribution function.

18. The system according to claim 17, wherein the processor is configured to select the user group based on the threshold orthogonality value.

19. The system according to claim 11, wherein the processor is further configured to compute an information transfer rate associated with each of the one of the plurality of signals and the at least one signal selected from the remaining portion of the plurality of signals selected in the user group.

20. The system according to claim 11, wherein the processor is further configured to select one of: the one of the plurality of signals, and the at least one signal selected from the remaining portion of the plurality of signals, based on at least one corresponding channel gain measurement.

21. The system according to claim 11, wherein the processor comprises at least one of a user scheduling processor and a threshold reduction processor.

* * * * *